United States Patent
Yeko, Sr.

(10) Patent No.: US 7,461,017 B2
(45) Date of Patent: Dec. 2, 2008

(54) SYSTEM AND METHOD FOR ENABLING JEWELRY CERTIFICATION AT LOCAL JEWELER SITES

(76) Inventor: Steven K. Yeko, Sr., 2329 Summit Dr., Janesville, WI (US) 53545

( * ) Notice: Subject to any disclaimer, the term of this patent is extended or adjusted under 35 U.S.C. 154(b) by 408 days.

(21) Appl. No.: 10/835,896

(22) Filed: Apr. 30, 2004

(65) Prior Publication Data

US 2005/0246239 A1 Nov. 3, 2005

(51) Int. Cl.
*G06F 17/30* (2006.01)

(52) U.S. Cl. .......................... 705/27; 705/26
(58) Field of Classification Search ............... 705/26, 705/27

See application file for complete search history.

(56) References Cited

U.S. PATENT DOCUMENTS

| | | | |
|---|---|---|---|
| 4,056,952 A | 11/1977 | Okuda | |
| 4,749,847 A | 6/1988 | Despres | |
| 4,900,147 A | 2/1990 | Bowley et al. | |
| 5,056,826 A | 10/1991 | Suwa | |
| 5,124,935 A | 6/1992 | Wallner et al. | |
| 5,379,102 A | 1/1995 | Takeuchi | |
| 5,615,005 A | 3/1997 | Valente et al. | |
| 5,673,338 A | 9/1997 | Denenberg et al. | |
| 5,757,474 A | 5/1998 | Sopori et al. | |
| 5,828,405 A | 10/1998 | Vanier et al. | |
| 5,899,503 A * | 5/1999 | Yoshizawa | 283/70 |
| 5,932,119 A | 8/1999 | Kaplan et al. | |
| 5,950,178 A | 9/1999 | Borgato | |
| 5,955,735 A | 9/1999 | Coleman | |
| 5,966,673 A | 10/1999 | Shannon, Sr. | |
| 5,983,238 A | 11/1999 | Becker et al. | |
| 6,020,954 A | 2/2000 | Aggarwal | |
| 6,211,484 B1 | 4/2001 | Kaplan et al. | |
| 6,239,867 B1 | 5/2001 | Aggarwal | |
| 6,304,853 B1 * | 10/2001 | Malnekoff | 705/27 |

(Continued)

FOREIGN PATENT DOCUMENTS

EP   1096410 A1   5/2001

(Continued)

OTHER PUBLICATIONS

PRN: "Ashford.com adds diamonds to luxury retail site," PR Newswire, Oct. 18, 1999, Dialog file 621, #02202180; 3 pgs.*

(Continued)

*Primary Examiner*—Robert M. Pond
(74) *Attorney, Agent, or Firm*—Whyte Hirschboeck Dudek SC (57) ABSTRACT

A system and method of providing informational certificates concerning characteristics of jewelry items to customers are disclosed. The system comprising, a terminal having a user interface configured to receive user input information concerning at least a first characteristic of a first jewelry item, a camera device capable of obtaining image information regarding at least a part of the first jewelry item, and a printing device at least temporarily coupled to the terminal and the camera device and capable of printing a first certificate, where the first certificate includes a first portion of information based upon the user input information and a second portion of information based upon the image information, and where the terminal, the camera device and the printing device are proximate a local point of sale of the first jewelry item.

32 Claims, 3 Drawing Sheets

U.S. PATENT DOCUMENTS

| | | |
|---|---|---|
| 6,309,690 B1 | 10/2001 | Brogger et al. |
| 6,476,351 B1 | 11/2002 | Kaplan et al. |
| 6,483,073 B2 | 11/2002 | Benderly |
| 6,529,612 B1 | 3/2003 | Gester et al. |
| 6,683,680 B2 | 1/2004 | Dinu et al. |
| 6,684,663 B2 | 2/2004 | Kaplan et al. |
| 6,954,194 B2 | 4/2004 | Simpson |
| 2001/0006415 A1 | 7/2001 | Dinu et al. |
| 2001/0024532 A1 | 9/2001 | Malnekoff |
| 2001/0032831 A1 | 10/2001 | Benderly |
| 2002/0052170 A1 | 5/2002 | Holloway |
| 2002/0117486 A1 | 8/2002 | Christensen |
| 2002/0165741 A1 | 11/2002 | Becker et al. |
| 2002/0184104 A1 | 12/2002 | Littman |
| 2002/0194092 A1 | 12/2002 | Tolkowsky et al. |
| 2003/0019852 A1 | 1/2003 | Kaplan et al. |
| 2003/0038121 A1 | 2/2003 | Christensen |
| 2003/0058917 A1 | 3/2003 | Benderly |
| 2003/0065586 A1 | 4/2003 | Shaftel et al. |
| 2003/0071021 A1 | 4/2003 | Benjano |
| 2003/0115079 A1 | 6/2003 | Rapaport |
| 2003/0120613 A1 | 6/2003 | Neogi |
| 2003/0163938 A1 | 9/2003 | Norton |
| 2003/0223054 A1 | 12/2003 | Warwick |
| 2004/0030565 A1 | 2/2004 | Hendry, Jr. |
| 2004/0068417 A1 | 4/2004 | Sevdermish |
| 2004/0072137 A1 | 4/2004 | Lapa et al. |

FOREIGN PATENT DOCUMENTS

| | | |
|---|---|---|
| JP | 7005830 | 1/1995 |
| JP | 9273994 | 10/1997 |
| JP | 2001071665 | 3/2001 |
| JP | 2001222590 | 8/2001 |

OTHER PUBLICATIONS

PRN: "Ashford.com adds diamonds to luxury retail site," PR Newswire, Oct. 18, 1999, Proquest #45627666, 4 pgs.

PRN: "Ashford.com offers. . . new standard for industry," PR Newswire, Sep. 29, 1999, Proquest #45202900, 4 pgs.

Ashford.com Internet Archive Wayback Machine, www.archive.org, www. ashford.com; 01, Apr. 24, 2003; 6 pgs.

PRN2: "Ashford.com unviels new luxury web site," PR Newswire, Aug. 16, 1999, Proquest #43949399, 3 pgs.

UU: Totty, Michael; "E-commerce. . . turn browsers into buyers," Wall Street Journal, Sep. 24, 2001, Proquest #81900990, 7 pgs.

Universal Gemological Services, Micro Appraisal, De. 8, 1999.

World Gemmological Laboratory, Appraisal Summary, Jan. 6, 2004.

http://www.thingswebuy.com/index.shtml, printed Mar. 15, 2004.

http://www.diamondinspector.com/urhome.cfm, printed Mar. 15, 2004.

http://www.diamondinspector.com//sampleReport.html. printed Mar. 15, 2004.

http://www.diamondinspector.com/about.cfm. About Diamond Inspector, printed Mar. 15, 2004.

http://www.bluenile.com, Diamons, Engagement Rings and fine Jewelry at Blue Nile, printed Mar. 15, 2004.

http://mysite,verizon.ent/vze6ox5r/uglinc, Universal Gemological Laboratory, printed Mar. 15, 2004.

http://www.diamondringsjewelry.com/Diamond_Appraisals.php. Diamond Appraisals, printed Mar. 15, 2004.

http://www.justappraisers.com, Just Appraisers Jewelry & Gemstone Appraisal Laboratory, printed Mar. 15, 2004.

http://www.diamonds-spectacular.com/diamond_appraisals.htm, Spectacular Diamonds Directory, printed Mar. 15, 2004.

EGL USA, Mid-America Jewelry News, Jan. 2004.

http://www.diamondgrading.com/ Articles_Certificate_vs_Appraisal.htm, Diamonds Certificate vs. Jewelry Appraisal, printed Mar. 15, 2004.

http://ww.diamondgrading.com, printed Mar. 15, 2004.

htttp://www.pricescope.com/appr_lsit.asp; Independent Diamond Appraiser, printed Mar. 15, 2004.

Grant, Lorrie, "More customers seek a girl's best friend online," USA Today, Apr. 1, 2004.

* cited by examiner

SYSTEM AND METHOD FOR ENABLING JEWELRY CERTIFICATION AT LOCAL JEWELER SITES

CROSS-REFERENCE TO RELATED APPLICATIONS

N/A

STATEMENT REGARDING FEDERALLY SPONSORED RESEARCH OR DEVELOPMENT

N/A

FIELD OF THE INVENTION

The present invention relates to the sale of jewelry and, more particularly, to systems and methods for grading and appraising jewelry items such as mounted diamonds.

BACKGROUND OF THE INVENTION

The jewelry industry is a highly-competitive and rapidly changing industry. Due to the relative infrequency with which individual consumers purchase jewelry, due to the wide variations in jewelry types, characteristics and values, and due to the relative difficulty in determining some characteristics associated with jewelry, consumers have difficulty in estimating the quality and value of jewelry items and often find the jewelry purchasing process to be a difficult one that involves a fair amount of apprehensiveness.

Traditionally, consumers have relied upon trusted local jewelers to explain the intricacies of jewelry to them when the time came for purchasing jewelry, and have also relied upon those jewelers to provide fair estimations of the quality and value of jewelry items that are being purchased. Nevertheless, as relationships have become more impersonal in the modern economy, consumers over time have also grown accustomed to obtaining independent, third-party verification of various characteristics of their jewelry as a supplement to simply relying upon the statements of their personal jewelers.

In the case of diamonds, for example, several organizations have emerged that are capable of evaluating a given diamond in terms of various diamond characteristics (e.g., cut, clarity, color and carats) and issuing a certificate regarding the diamond's "grade" based upon its characteristics. In some circumstances, the issued certificate also will include an appraisal of the diamond's replacement value or cost, based upon its grade and possibly other information as well. Among the prominent organizations existing for providing such third-party verification of diamonds are the Gemological Institute of America (GIA), the American Gem Society Laboratories (AGSL), the World Gemmological Laboratory and the European Gemmological Laboratory (EGL).

Obtaining verification of a piece of jewelry's quality/value in this manner is a fairly complicated and costly procedure. The costs of mailing a jewelry item to and from a third-party evaluator, insuring the jewelry item during the process, and paying for the charges of the third-party evaluation can become large (e.g., the fees of the third-party evaluator can themselves be in the range of $40 to $100 per item). In the case of moderately-expensive to expensive jewelry, such as diamonds worth $5000 or more, this is a cost that many consumers and/or jewelry retailers are willing to bear. However, in the case of less expensive to inexpensive jewelry (e.g., jewelry worth under $5000), such costs are typically too excessive to justify the third party evaluation.

Nevertheless, consumers purchasing less expensive to inexpensive jewelry still often do (or would) desire to have some type of verification or confirmation of the quality/value of jewelry items that they purchase. Some of this has been driven by the emergence of the internet and related e-commerce relating to the sale of jewelry items. Companies such as Blue Nile, Inc. have emerged that allow consumers to purchase jewelry items via the internet without physically visiting a retail outlet or viewing, in person, the jewelry item being purchased before the purchase is made. To allay informational and other concerns that consumers might have about the merchandise being purchased, such internet-based jewelry retailers have offered consumers grading/appraisal certificates regarding the jewelry being purchased.

As this internet jewelry trade has become more established, the desire on the part of consumers for similar grading/appraisal information in other, non-internet jewelry retail venues has increased. Consequently, as department stores and chain stores have expanded their capability to sell jewelry, particularly jewelry in this less expensive to inexpensive category, they have attempted to meet this consumer desire by offering identification certificates for the jewelry being sold and also, in some circumstances, providing an indication of "replacement value" on the certificates.

While appearing to provide valuable information to consumers, these certificates provided by department stores and chain stores are sometimes of limited actual value. Grading of the jewelry as indicated on the certificates may sometimes be performed in an inconsistent or "bulk-quantity" manner with few governing standards. In particular, the grade provided for an individual item of jewelry may not be determined at the time of purchase based upon an evaluation of that specific jewelry item but rather may be based upon a typical or average grade determined a priori for a group of jewelry items of which the specific jewelry item is one example. Indications of "replacement value" also may be determined in a relatively inconsistent or "bulk-quantity" manner that does not necessarily reflect the particular piece of jewelry under consideration. Further, since the grade and replacement value information indicated on such certificates is determined by the individual department store(s) or chain store(s) themselves, it may not always be appropriate to presume that this information is independent and unbiased.

Despite these concerns associated with department and chain store-issued jewelry certificates, consumers nevertheless perceive these certificates to have value, often simply because of the large size and prominent market reputations of particular department stores and store chains. For this reason, independent jewelry stores are coming under increased competitive pressure from department stores and chain stores, particularly with respect to the sale of less-expensive to inexpensive jewelry. Further, consumers who might otherwise benefit from the expertise and individualized customer care offered by independent jewelers are sometimes forgoing these benefits, in order to obtain these perceived benefits associated with department and chain store-issued certificates.

For at least these reasons it would be advantageous if a new system and method could be developed that allowed independent jewelers to provide, in a simple and cost-effective manner, information to consumers regarding the grade, quality and/or value of their jewelry, particularly (although not limited to) jewelry in the less expensive to inexpensive price range. It further would be advantageous if such information could be generated in a consistent, reliable manner and/or in a manner with sufficient safeguards such that, regardless of whether the information was actually determined by an independent third-party, the information properly could be considered to be accurate and unbiased and could be marketed to consumers as such. Also, it would be advantageous if such information could be provided to consumers in a format that buttressed consumers' sense of the value of the information.

BRIEF SUMMARY OF THE INVENTION

The present inventors have recognized that, despite the fact that independent local jewelers are generally capable of making competent determinations regarding the grade/quality/value of jewelry items by themselves, there nevertheless remains a need for a system or method that would enable independent local jewelers to provide such grade/quality/value information to consumers in a simple, inexpensive manner that not only satisfied consumer desires in terms the presentation, format, or appearance of such information but also satisfied consumer desires for having accurate, unbiased and independent information. Having recognized this need, as well as the general competency of independent local jewelers in making determinations regarding the grade/quality/value of jewelry items, the inventors have further recognized that this need can be satisfied by (i) providing independent local jewelers with a standardized or semi-standardized process and/or system for creating certificates (or similar printed materials) concerning the grade, quality and/or value of individual jewelry items at the local points of sale, e.g., within the local jewelry stores themselves; (ii) providing customers with an independent, third-party guarantee or warranty that the certificates are accurate, such that refunds or other benefits are provided to customers who demonstrate that certificates issued to them are incorrect; and (iii) empowering the third party guarantor/insurer with the ability to take stringent enforcement actions against those local jewelry stores that mistakenly (or fraudulently) happen to issue incorrect certificates, thereby maintaining the reputation and integrity of the overall certificate-issuance system.

In at least some embodiments, the system for creating certificates includes a set of first local system components that include both a printer for printing certificates and a user interface by which information concerning the jewelry items can be input for printing onto certificates by way of the printer, the information typically (though not necessarily) being input to the terminal by the local independent jeweler at which the first local system components are located. In at least some embodiments, the printer is further at least temporarily in communication with a camera device by which one or more photographs of jewelry items can be obtained, and the printer in turn is able to print graphical images of the jewelry items on the certificates in addition to other information.

In at least some additional embodiments, these local system components are in communication with a remote, central terminal by way of the internet or other communication network(s), and information regarding jewelry items as well as possibly software program information and related data for operating the camera device, printer and other local system components can flow between the central terminal and the local system components. The remote, central terminal can be operated, for example, by a third-party guarantor/insurer of the certificates. In at least some embodiments, portions of the information at the central terminal can further be accessed by a variety of other users, consumers, guarantors, insurers/re-insurers or independent jewelers using their own local system components of various types.

In particular, the present invention relates to a system for providing informational certificates concerning characteristics of jewelry items. The system includes a terminal having a user interface configured to receive user input information concerning at least a first characteristic of a first jewelry item, a camera device capable of obtaining image information regarding at least a part of the first jewelry item, and a printing device at least temporarily coupled to the terminal and the camera device and capable of printing a first certificate. The first certificate includes a first portion of information based upon the user input information and a second portion of information based upon the image information and each of the terminal, the camera device, and the printing device are proximate a local point of sale of the first jewelry item.

Additionally, the present invention relates to a method of providing information regarding characteristics of jewelry items to consumers. The method includes obtaining image information of a jewelry item by way of a camera device, obtaining further information regarding at least one characteristic of the jewelry item via a user input device, and printing a certificate by way of a printing device, wherein the certificate includes at least one of a first portion of information based upon the image information and a second portion of information based upon the further information.

DETAILED DESCRIPTION OF THE PREFERRED EMBODIMENT

Figure 1:
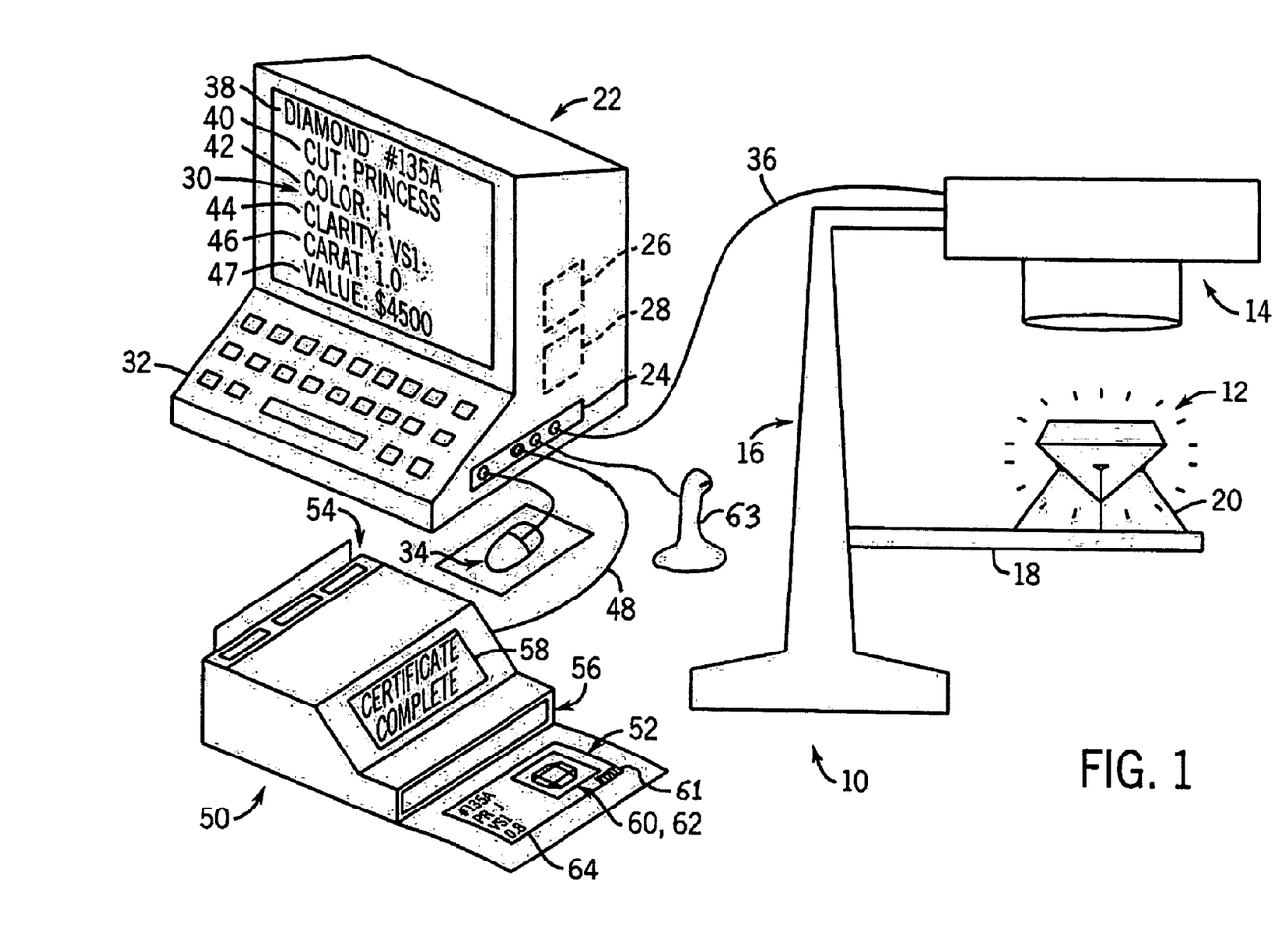
FIG. 1 shows in schematic form a first embodiment of a system for providing information to consumers regarding characteristics of jewelry items.

Referring to FIG. 1, components of a first exemplary system 10 for providing printed information to consumers regarding jewelry items such as a first jewelry item 12 are shown. In the embodiment shown, the system 10 includes a camera device 14, a computer terminal 22 providing a user interface, and a printing device 50. The camera device 14, which is supported upon a stand 16, is capable of taking images and/or otherwise obtaining image-related information concerning the first jewelry item 12. In preferred embodiments, the camera device 14 is able to obtain and provide image data on a very rapid (or immediate or nearly immediate) basis. In the embodiment shown, the first jewelry item 12 is also supported by the stand 16, by way of a ledge 18 and various support arms 20. However, in alternate embodiments, the jewelry item 12 can be supported by way of another support device than that shown and need not be supported by the stand 16 for the camera device 14.

The camera device 14 is intended to be representative of any of a variety of devices capable of obtaining image information that is suitable for obtaining image information regarding imaging characteristics of jewelry items such as the jewelry item 12. The camera device 14, therefore can be representative of a variety of digital cameras, film photography cameras, moving picture cameras such as camcorders and video cameras, and a variety of other devices. Depending upon the embodiment, the camera device 14 can be understood to include the stand 16 (and ledge 18 and support arms 20).

Also included within the system 10 is the computer terminal 22 that includes an input/output interface 24, a memory unit 26, and a processing unit 28, which can be, for example, a microprocessor or other computer processor or other processing device known to those of ordinary skill in the art. The computer terminal 22 additionally includes a video screen 30 on which can be displayed various information (e.g., text information as well as graphical information) and a keyboard 32. In the embodiment shown, the computer terminal 22 further includes a peripheral input device shown to be a mouse 34 that is coupled to the rest of the computer terminal 22 by the input/output interface 24. The computer terminal 22 is capable of receiving the image information regarding the first jewelry item 12 from the camera device 14 by way of a communication link 36 coupling the camera device 14 and the computer terminal 22.

Additionally, the computer terminal 22 is capable of receiving additional information regarding the first jewelry item 12 as input by a user by way of the keyboard 32 and/or the mouse 34. The jewelry item 12 is intended to be representative of any of a variety of different types of jewels and jewelry items including, for example, precious stones such as diamonds, rings, pieces of jewelry having jewels embedded therewithin, necklaces, and a variety of other types of jewelry made of a variety of materials such as gold, silver and platinum. In the example where the first jewelry item 12 is a diamond as shown in FIG. 1, the user input information that is entered by way of a user at the keyboard 32 and/or the mouse 34 can be, for example, information such as that shown on the screen 30, namely, jewelry identification information (e.g., a diamond identification number) 38, a diamond cut 40, a diamond color rating 42, a diamond clarity grading 44, a diamond carat value 46 and an estimated monetary value of the diamond 47 (e.g., in the example shown, the diamond is number 135A, and is a H color, VS1 princess cut 1.0 carat diamond having an estimated value of $4500).

In the embodiment shown, each of the types of information 38-46 are input by a user via the keyboard 32 and/or the mouse 34; however, in alternate embodiments, some portions of this information could be obtained in other ways, for example, a color rating for the first jewelry item 12 could be determined by way of the camera device 14. In some embodiments, the screen 30 is further capable of displaying the image information obtained via the camera device 14 or information based in part upon that image information (e.g., an image showing a part of the jewelry item in detail). The information received by way of the camera device 14 and by way of the keyboard 32 and/or mouse 34 can be stored in the memory unit 26 of the computer terminal 22, as well as processed by way of the processing unit 28.

The computer terminal 22 is further coupled, by way of a second communication link 48 also coupled to the input/output interface 24, to the printing device 50. The printing device 50 allows for the printing of certificates such as a certificate 52 that contain all of, or one or more portions of, the image information provided by the camera device 14 and the other information input by the user by way of the input devices 32, 34 (e.g., the information 38-47), or information that is based upon that image information and/or user input information. The printing device can be any of a number of different printing devices known to those of ordinary skill in the art that are capable of printing hard copies of documents on paper or similar materials to obtain certificates, business cards and/or other printed media on which various textual, graphical (including, for example black and white and/or color images) and/or other information is shown. For example, the printing device 50 can be a laser printer, a dot matrix printer, or other types of printing devices.

Typically, the printing device 50 will, as shown, include an input port 54 at which a user can insert a blank piece of paper or other blank or partly-printed medium and an output port 56 at which a completed certificate such as the first certificate 52 or other printed medium is output. Depending upon the embodiment, the printing device 50 also can have a display 58 that indicates information such as printing status (in the example shown, a certificate has just been printed and consequently the display shows "certificate complete"). Depending upon the embodiment, the printing device 50 can be directly controlled by the computer terminal 22 by way of the communication link 48 or, alternatively, can be partly or entirely self-controlled, in which case the printing device 50 requires only some or no control commands from the computer terminal and primarily receives only data from that terminal 22.

The printed certificate 52 (or other printed medium) can display a variety of information regarding one (or potentially more then one) jewelry item such as the jewelry item 12. In the example shown, an image 60 (for example, a clear, full color digital quality photo) is provided on a right side 62 of the certificate 52, while the input information 38-47 is provided in modified form along a left side 64 of the certificate. In certain embodiments, the certificate 52 is laminated/plastic coated to improve the longevity of the document. While in some embodiments, the certificate is relatively large in size (e.g., 8-½ by 11 inches), in other embodiments the certificate can be smaller in size such as the size of a business card. Also, the color and various ornamental/design features (e.g., the look of the certificates) of the certificate can vary depending upon the embodiment. In some embodiments the certificates can be numbered (to allow for accounting/tracing of issued certificates. Depending upon the embodiment, the certificates can also list additional information such as warranty policy information, and phone number/other contact information regarding who to contact in the event of a question or problem regarding the certificate or the jewelry items(s) that are the subject of the certificate. In some embodiments, the printed material is accompanied by other items; for example, outer display boxes (e.g., ring boxes) and other containers can be provided to hold both the jewelry items sold and the certificates, wallets can be provided to hold business-card-sized printed certificates, and counter support material and signs/posters can be provided as well.

The components of the system 10 can be varied, in alternate embodiments, from those shown. For example, in certain embodiments, the computer terminal 22 can be replaced with a simpler user interface that does not use its own memory unit to record user input information or its own processing unit to process such information or information received from the camera device 14. In such embodiments, each of the camera device 14 and the user interface can be directly coupled to the printing device 50, which would in some such embodiments include its own memory and/or processing capabilities for handling information received from the user interface and the camera device. That is, in such embodiments, the printing device can be the "smart" device while each of the camera device and the user interface can be relatively "dumb" machines.

The exact features of the user interface, whether included as part of the computer terminal 22 as shown or whether as part of some other device, can vary to include touch screens, hand-held devices such as personal digital assistants, and other input/output devices known to those of ordinary skill in the art. The communication links among the various components of the system can also be modified from that shown in FIG. 1; for example, each of the components could be coupled to a network rather then by way of the direct, dedicated communication links 36 and 48. In still further embodiments, the camera device 14 can include various memory and processing components allowing for more complicated processing of the imaging information and/or other information such as that provided by way of user interface. In other embodiments, two or more of the computer terminal 22, camera device 14 and printing device 50 can be physically incorporated into a single device.

In the embodiment of FIG. 1, all of the components of the system 10 can be located at the point of sale. While it is possible that in certain embodiments each of the camera device 14, the printing device 50 and the user interface (of the computer terminal or otherwise) would be strictly hardware components, typically one or more of these devices will operate based at least in part upon software programming and related data. Such programming used by the computer terminal 22 and/or the other devices such as the camera device 14 and the printing device 50 can be provided when the system is purchased, for example, in the form of a floppy disc or a CD ROM containing such programming information that can be loaded onto the computer terminal 22. Typically, such software would enable communications of information among the various devices of the system 10 as well as enable processing of such information, such as imaging processing.

In certain embodiments, the software provides a graphical user interface on the computer terminal 22 that includes one or more windows having fillable blank portions that can be filled with data by a user or edited, such that a user can edit various jewelry-related and other information (e.g., edit a jewelry item grade or replacement value). Also, in certain embodiments, such a graphical user interface would allow for a prescreening of any image obtained by the camera device 14 and processing of that image device (e.g., rotation, changing of colors, tint, gray scale, size and other image characteristics known to be modifiable by those of ordinary skill in the art). In certain embodiments, the software would include programming allowing for estimates of jewelry items' value to be calculated based upon other information input by users, such as the diamond-related information shown as information 38-46 on FIG. 1 or certain market-related information.

In general, the present invention is intended to encompass all systems such as the system 10 that can be at least partly located at the point of sale of jewelry items, particularly, for example, at independent jewelry stores, and that can be utilized by sales people and others at those points of sale to generate certificates or similar printed material on which information regarding the jewelry items' grade, value, quality or other related characteristics can be provided to customers. Typically, to determine quality, grading and valuation information regarding the jewelry items, the systems depend exclusively or at least largely upon information that is determined and provided by the operators of the systems at these local points of sale, e.g., the local jewelers themselves.

While reliance upon such certificates by consumers is largely justified in most instances by the fact that independent jewelers are typically competent in determining these types of information on their own, in at least some embodiments the printed information is backed up by another "secondary" company or other entity that typically is unaffiliated with the independent jewelry stores providing the certificates. Such secondary company would provide a warranty or guarantee that the printed information on the certificate is in fact accurate, thus effectively providing a customer with insurance covering the risk that the particular independent jeweler with whom the customer is dealing is both competent and trustworthy. The name of the secondary company would be listed on the printed certificate, indicating that the secondary company guaranteed that the information on the certificate was correct.

In the event that a customer came to believe that the information provided on a certificate issued in relation to a purchased jewelry item was inaccurate, the customer could send in the certificate and jewelry item for reevaluation by the secondary company. Upon determining that there was a problem, the secondary company in turn could provide a refund to the customer, for example, a refund of the difference between the value of the jewelry item as listed on the customer's certificate and the value of the jewelry item as determined by the secondary company (or a refund of the difference between the value of the jewelry item given the quality/grading information listed on the certificate and the actual value of the jewelry item). Also, a reissued, corrected certificate could be provided to the customer. The secondary company could further demand reimbursement of the refunded money from the original jeweler that issued the certificate and, if such reimbursement was not forthcoming, prohibit the original jeweler from continuing to issue certificates in the secondary company's name. In this manner, customer inquiries and complaints would serve as a "policing mechanism" by which the secondary company could maintain the quality and accuracy of the issued certificates.

While in the present embodiment, the certificates are printed and issued exclusively by the independent jewelers, in alternate embodiments only first or "rough" drafts of the certificates would be immediately printed and issued to consumers by the independent jewelers. In such alternate embodiments, "final" drafts of the certificates would subsequently being printed and provided to consumers by the secondary company providing the warranty/guarantee (or possibly some other third party), and the final drafts of the certificates could take on a different from (e.g., a business-card size) than that of the rough drafts of the certificates (which might still be in an 8½" by 11" format). The information provided on the final drafts of the certificates would still be largely if not entirely based upon information determined by the independent jewelers (which could be communicated to the secondary company either by sending the secondary company copies of the rough drafts of the certificates or electronically as discussed with respect to FIG. 2), and consequently the secondary company would still serve as a guarantor with respect to the certificates. In further alternate embodiments, rough drafts of certificates (or some portion of the certificate information, such as an image of a jewelry item) could be printed on receipts provided to customers.

Figure 2:
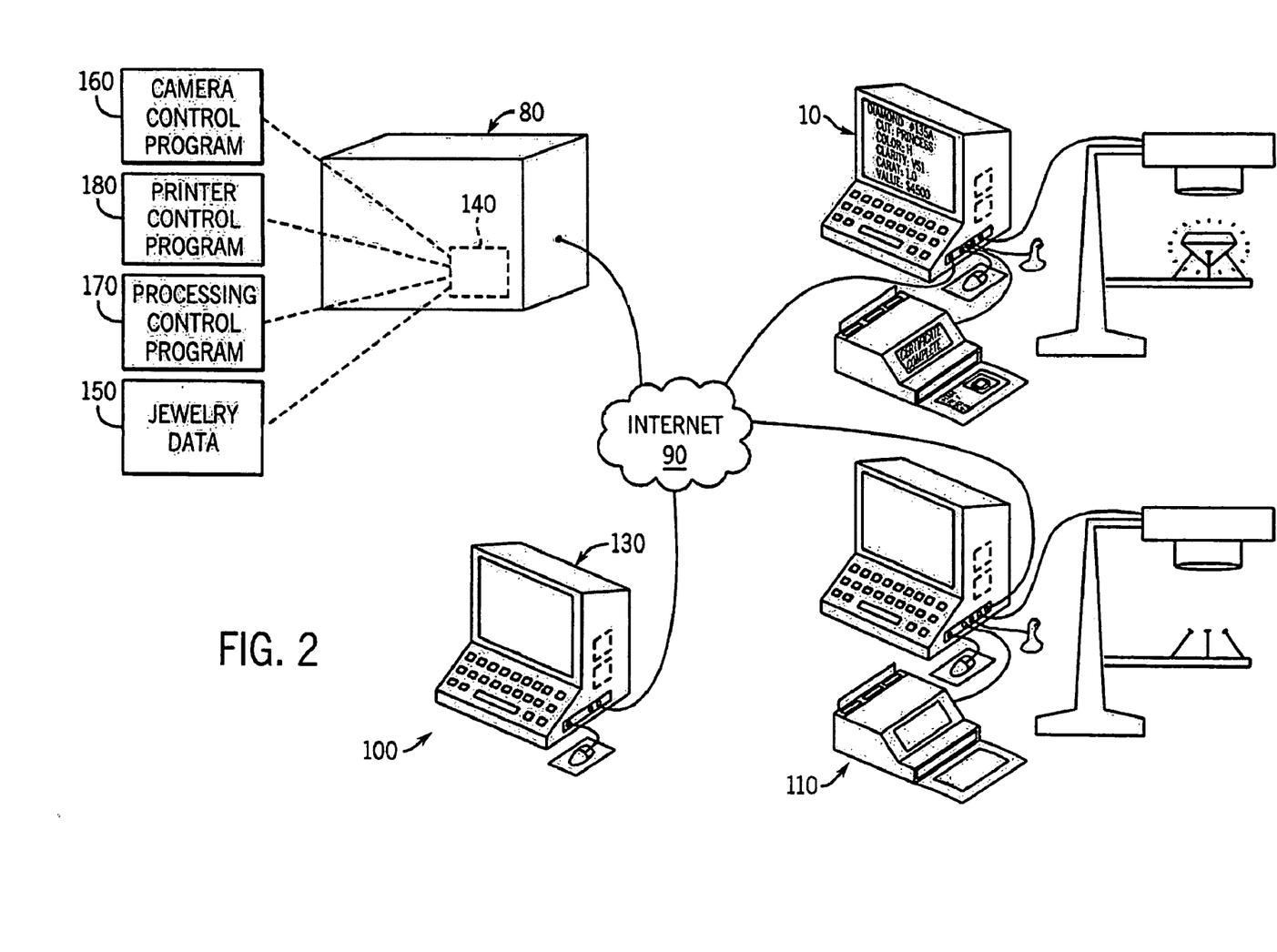
FIG. 2 shows in schematic form a second embodiment of a system for providing information to consumers regarding characteristics of jewelry items, which includes certain local components in communication with a remote, central terminal.

Turning to FIG. 2, while in certain embodiments of the present invention (such as that shown in FIG. 1) the components of the system are localized at a point of sale such as the store of an independent jeweler, in other embodiments the system can include not merely local components at a single jeweler or other point of sale but rather can also include additional components at other locations. In the example of FIG. 2, a system 100 includes not only the system components 10 of FIG. 1 at a local point of sale, but further includes a central terminal 80 that is located remotely from the local components of the system 10. In the embodiment shown, the system 10 and the central terminal 80 are coupled by way of the internet 90, although in other embodiments dedicated telephone lines and other communication links known to those of ordinary skill in the art could be used instead or in addition to the internet. The central terminal 80 in turn can be coupled to any one of a number of other systems at other locations or points of sale, such as an additional system 110 and an additional computer terminal 130. The systems at the various different locations need not have identical components, although in the embodiment shown systems 10 and 110 have such identical components. The additional computer terminal 130 in particular is intended to be representative of other devices, systems and/or parties that can be in communication with the central terminal 80 even though those parties are not themselves intending or able to create certificates for consumers.

The central terminal 80 can serve a variety of purposes depending upon the embodiment. In particular, the central terminal 80 can include one or more databases 140 that can store various information and/or programming. In particular, the database 140 can store jewelry data 150 that is uploaded from the various local systems such as the systems 10 and 110. Depending upon the embodiment, the jewelry data 150 uploaded from the local systems such as systems 10 and 110 can include not only graphical and textual data pertaining to jewelry items per se (e.g., images, as well as grading, quality, or valuation information) but also name, address and other customer-related information regarding the customers who have purchased (or even have considered purchasing) particular jewelry items from the independent jewelers operating the local systems, as well as certificate identification numbers, certificate-issue dates and other information regarding certificates that have been issued by way of the local systems (e.g., amounts of insurance coverage provided with respect to different certificates). In certain embodiments, the database 140 stores all data associated with issued certificates. Preferably, the databases 140 store and organize information in a manner that facilitates not only the efficient storage of such information but also allows for information to be retrieved, sorted and searched efficiently.

Storage of this information at the central terminal 80 allows this information to be maintained indefinitely for later access both by the independent jewelers who have entered or developed this information and provided certificates based upon this information, as well as by customers who have been issued certificates, as well as by potential third-parties who are interested in the jewelry data. Such third-parties can include other independent jewelers at points of sale other then those which have created the jewelry data, as well as other third-parties who merely wish to inquire about this information. Such customers, other independent jewelers and other third-parties can access some or all of this information stored at the central terminal 80, for example, by way of the additional computer terminal 130 or other similar terminals. The central terminal 80 in at least some embodiments allows for independent jewelers and others to enter search queries that cause the central terminal 80 to identify and retrieve relevant information from the databases 140 (e.g., all certificates issued by a particular independent jeweler).

Although not necessarily the case, the central terminal 80 typically is the property of, and/or operated by, one of the above-discussed secondary companies that serve to provide a guarantee/warranty/insurance regarding issued certificates. By receiving and analyzing the jewelry date 150 at the central terminal 80, it is possible not only for the secondary company to keep track of the activities of independent jewelers operating the local systems 10, 110 and issuing certificates, but also possible for the secondary company to maintain its own records of issued certificates that, in the event of a customer complaint, allow the secondary to independently verify that the certificate information provided by the customer corresponds to the certificate information supposedly provided by the independent jeweler that issued the certificate and sold the related jewelry item. The storage of certificate information at the central terminal 80 also allows the secondary company to provide an independent jeweler with an inventory and history of the certificates that have been issued by way of the independent jewelers. In some embodiments, an independent jeweler can access the central terminal 80 and obtain (and print out) information regarding the certificates that have been issued by the jeweler, including information sorted by type/category of certificate (for example, a listing of all certificates that have been issued for jewelry items within a certain price range), as well as print out additional copies of the issued certificates themselves. Also, the independent jeweler can access the central terminal 80 to obtain a mailing list of all (or a subset of the) customers to which the jeweler has issued certificates.

In some circumstances, when information regarding a particular jewelry item has been determined by one of the local systems 10, 110 but the jewelry item to which the information pertains did not end up being sold, the uploading of that information to the central terminal 80 can facilitate the later sale of that jewelry item by other retailers who have access to that information even though they do not have that jewelry item in their possession. In some embodiments, for example, all retailers (or at least retailers that are licensed to access the central terminal 80) are able to access wholesale price and pictured inventory information stored on the databases 140. Further, in some embodiments, customers are able to access this information regarding unsold jewelry items by way of their own computers (e.g., over the internet) or other terminals such as the additional computer terminal 130. In some circumstances, such customers are further able to purchase jewelry items using their own computers by contacting the central terminal 80 and appropriately interacting with the central terminal. In this manner, a secondary company associated with the central terminal 80 can operate as a middleman between a customer desiring a jewelry item and an independent jeweler in possession of the jewelry item. In such circumstances, customers again can potentially access the photographic (or other graphical) information regarding the jewelry items, as well as the grading/quality/value/price information concerning the jewelry items. Thus, in certain embodiments, the information stored at the central terminal 80 can be accessed and utilized by wholesalers, retailers, customers (e.g., customers on the internet) and others to further promote the sale of jewelry items.

In further embodiments, customers, potential customers, or other parties can also access the central terminal 80 to obtain various other information such as, for example, a listing of independent jewelers or others who are licensed, qualified, authorized or otherwise able to issue certificates that are recognized by the secondary company (or to check if a particular entity is so licensed), the capability to search for such licensed independent jewelers or other parties (e.g., by way of state or zip code), information regarding how jewelry items such as diamonds are graded (e.g., charts and other information regarding grading standards such as those used by recognized grading companies), and information regarding how to obtain casualty loss and other similar types of insurance for jewelry items (e.g., a list of insurers, exemplary insurance prices, and other related information).

Also, by recording this information at the central terminal 80, it is possible to determine when appraisal values or other time-varying characteristics of jewelry items may have changed sufficiently that issued certificates should be updated, and consequently can facilitate a program of offering updated certificates to consumers who have been issued certificates (in some embodiments, information stored at one of the local systems such as the system 10 can also be used for this purpose). In some circumstances (e.g., when an appraisal update package is purchased by a customer), updates to an issued certificate will be regularly (e.g., annually) generated and provided to a customer who have been previously issued the certificate.

Further, if the central terminal 80 is owned, operated by and/or otherwise associated with a secondary company as discussed above, the maintaining of the jewelry information at the central terminal 80 facilitates the ability of the secondary company to act as a final arbiter of whether representations made on the certificates are in fact accurate, as discussed above Thus, in the event that a customer believes that certain information on an issued certificate is incorrect, the customer can provide the certificate number along with the jewelry item to which it pertains to the secondary company. If the secondary company determines based upon the information in the central database 80 corresponding to the certificate number that the information on the certificate is in fact false or inaccurate, the independent entity can refund some or all of the purchase price of the jewelry item to the customer and, at the same time, identify the independent jeweler/retailer who developed the erroneous certificate. Also, by keeping track of which certificates are owned by which independent jewelers, the second company can provide customers with information about the performance of those independent jewelers over time.

Also as indicated in FIG. 2, the central database 140 of the central terminal 80 can also include various programs and related information for governing the components of local systems such as, for example, a camera control program 160 for controlling camera devices such as the camera device 14, a processing control program 170 for controlling image or other data processing performed by a component such as the computer terminal 22, and also a printer control program 180 capable of controlling the operation of printing devices such as the printing device 50. In some embodiments, the control program 170 further includes programming that allows for communications between the central terminal 80 and the local systems 10, 110 (or terminal 130). In some circumstances, the systems 10, 110 could be configured to automatically communicate/interact with the central terminal 80 without user instruction. For example, in one embodiment, the systems 10, 110 could be programmed to send certificate-related information to the central terminal 80 whenever a certificate was printed out or otherwise issued. Also, in certain embodiments, one or more of these programs could be downloaded to the local systems 10, 110 when those systems are first initially brought on line by an independent jeweler or retailer. Once downloaded and installed, the programs would not need to be repeatedly downloaded except in situations where the programs needed to be updated or corrected.

In some embodiments involving internet-based communications, a server program at the central terminal 80 would be capable of communications with a browser program at one or more of the local systems such as the local systems 10, 110 and potential at other locations as well, such as the terminal 130. In such embodiments, the central terminal 80 could provide a website having one or more web pages that were accessible by the browser programs. In some such internet-based embodiments, the central terminal 80 would provide information in the form of Java applets to the browser programs, to allow for the display of particular information (including graphical images, textual information and other information pertaining to certificates, etc.) at the local systems 10, 110, terminal 130 or other locations. In other internet-based embodiments, a given local system would require the direct control of its operation at any given time by programming residing at the central terminal 80. For example, in one embodiment, a user at a local retailer would log onto the internet 90 by way of a browser program operating on the user interface. Upon establishment of communications between such browser program and a web server at the central terminal 80, the central terminal would then be in a position to govern operations of the components of the local system.

Although FIG. 2 shows the overall system 100 as being capable of both uploading jewelry information to the central terminal 80 from the local systems 10, 110, downloading such jewelry information from the central terminal to the local systems as well as to possible third-party systems, and also the downloading of control programs to local systems or direct controlling of those local systems by way of the central terminal, the present invention is also intended to encompass embodiments in which only one or more of these different types of communications among the central terminal 80 and the various local systems or other third-party systems occur.

Figure 3:
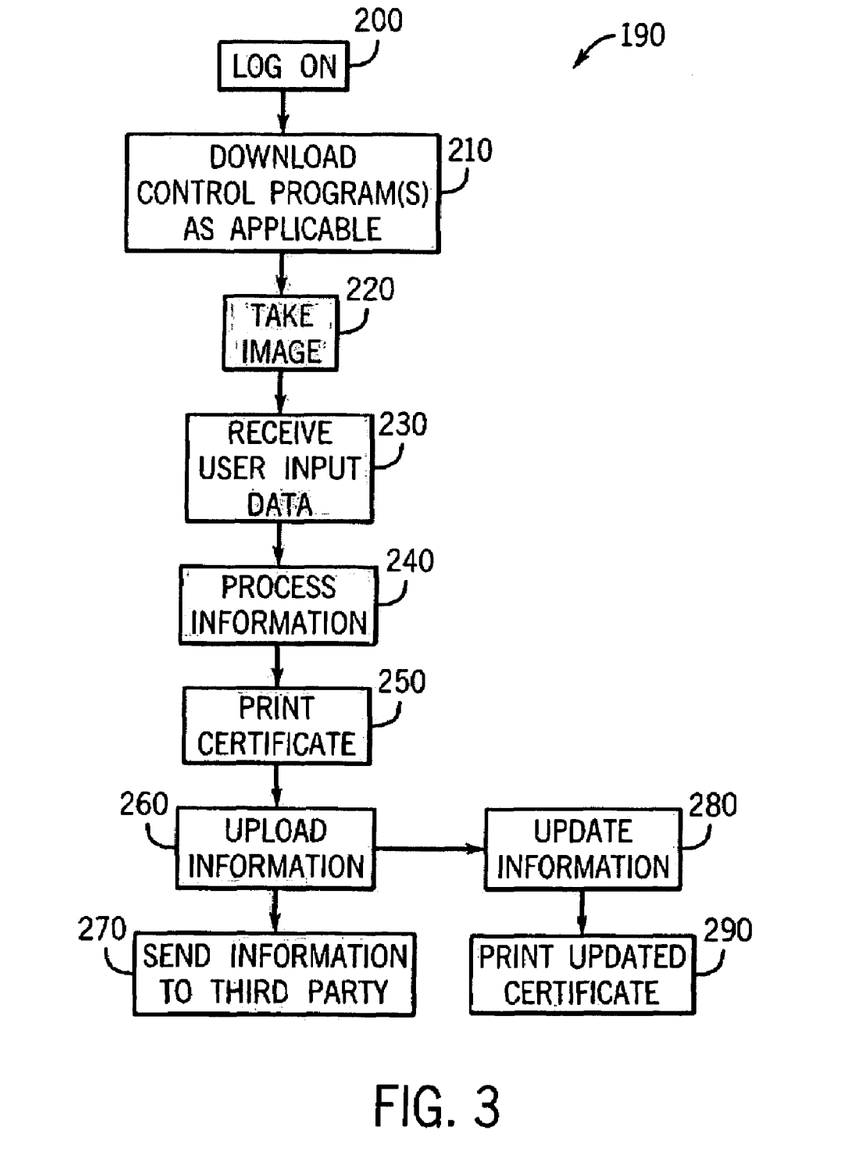
FIG. 3 is a flow chart showing exemplary steps of operation of the system of FIG. 2.

Turning to FIG. 3, a flow chart 190 shows exemplary steps of operation of the system 100. In a step 200, a user at one of the local systems such as the system 10 logs onto the internet 90 by way of a browser program and establishes communications with a server program at the central terminal 80. Assuming that this is the first time that the local system has established communications with the central terminal 80, in this first interaction, the various control programs such as programs 160, 170 and 180 are downloaded at a step 210 from the central terminal to the local system, for example, to the computer terminal 22 of the system 10. Assuming, in the present example, that the central terminal 80 does not provide for continuous direct control of the local system, but rather that the local system controls its own operation by way of the downloaded control programs once they have been downloaded, the local system 10 is then capable of operating on its own to print certificates regarding jewelry items. Thus, at a step 220, when a jewelry item is provided for which a certificate needs to be made, the system obtains an image of that jewelry item by way of the camera device 14.

Further, at a step 230, the local system 10 further receives other information concerning the jewelry item such as information of the types 38-47 of FIG. 1. Next, at a step 240, the various image and other jewelry information is processed, for example, by way of the processing unit 28 implementing the downloaded processing control program 170. This information is provided then to a printing device such as the printing device 50, which prints a certificate based upon the information at a step 250. Once a certificate has been printed (or at least once the information to be printed on a certificate has been assembled), the jewelry information is also uploaded to the central terminal 80 at a step 260. Once the central terminal 80 has that information it can further (at a step 270) be provided to other users of other local systems such as the system 110, as well as to other third parties who may design that information, e.g., at terminal 130. The uploaded information can also be the basis for determining whether future updates to the information are necessary, and in some embodiments the central terminal 80 is capable of automatically or semi-automatically updating information in its own database 140 as well as automatically sending out notices to customers who have been issued certificates that updated certificates or other information are available, as indicated at a step 280. If a customer requests such an updated certificate, that certificate can be printed and provided to the customer at a step 290.

It is specifically intended that the present invention not be limited to the embodiments and illustrations contained herein, but include modified forms of those embodiments including portions of the embodiments and combinations of elements of different embodiments as come within the scope of the following claims. Additionally, the present invention is intended to be applicable not only to a variety of different types of jewelry items, but also to a variety of other moderate to less-expensive collectible-type items including, for example, coins, antiques, baseball cards, dolls, and other similar collectibles that are available from a wide variety of different retailers.

I claim:

1. A method of certifying jewelry items sold by jewelry retailers to customers, the method involving interactions between retailer terminals of the jewelry retailers and a central terminal of an entity independent of the jewelry retailers, the method comprising:
  (a) making available a website at the central terminal, wherein the website is accessible by the retailer terminals via an internet-based communications medium;
  (b) sending web page information from the central terminal for receipt by the retailer terminals, the web page information allowing for the formation of at least one graphical user interface at the retailer terminals;
  (c) receiving and storing at the central terminal respective jewelry-related information pertaining to respective ones of the jewelry items, the jewelry-related information being received from the retailer terminals subsequent to entry of at least some of the jewelry-related information by the jewelry retailers via the at least one graphical user interface at the retailer terminals, wherein the jewelry-related information includes image information regarding the jewelry items obtained from camera devices and information regarding at least one characteristic of the jewelry items entered by the jewelry retailers via user input devices associated with the retailer terminals of the jewelry retailers;
  (d) issuing certificates from the entity to be provided to the customers when the jewelry items are sold to the customers, wherein each respective certificate includes the respective jewelry-related information pertaining to the respective jewelry item sold, and wherein in relation to the sales additional information is received and stored at the central terminal, the additional information including certificate numbers corresponding to the issued certificates, customer-related information concerning the customers who purchased the jewelry items, and retailer-identity information concerning the jewelry retailers who sold the jewelry items purchased by the customers;
  (e) providing guarantees or warranties from the entity to the customers that the jewelry-related information provided on the certificates is accurate, wherein the entity in particular provides the guarantees or warranties in relation to those of the certificates that pertain to those of the jewelry items sold by authorized ones of the jewelry retailers; and
  (f) performing, by the entity, at least one additional action upon the entity detecting inaccurate information in at least one of the certificates based upon a comparison of customer-provided information with at least some of the information stored at the central terminal, the at least one additional action including at least one of: taking at least one enforcement action against at least one of the jewelry retailers; providing at least one refund to at least one of the customers; and providing at least one corrected certificate to at least one of the customers.

2. The method of claim 1, wherein the at least one graphical user interface at the retailer terminals further allows for the jewelry retailers to view draft certificate images.

3. The method of claim 1, further including:
  (g) determining based at least in part upon the jewelry-related information at the central terminal that a first characteristic of a first of the jewelry items may have sufficiently changed subsequent to the issuing of a first of the certificates pertaining to the first jewelry item, such that it is appropriate for the first certificate to be updated.

4. The method of claim 3, further including:
  (h) upon making a determination in accordance with (g), sending an offer from the entity regarding updating of the first certificate pertaining to the first jewelry item.

5. The method of claim 1, further including sending data from the central terminal to at least some of the retailer terminals in response to inquiries received at the central terminal from the at least some retailer terminals, the sent data including at least some of the jewelry-related information and the additional information stored at the central terminal.

6. The method of claim 1, further comprising: sending further data in response to additional inquiries received at the central terminal regarding identities of the authorized ones of the jewelry retailers in relation to which the entity is willing to provide the guarantees or warranties.

7. The method of claim 1, further comprising evaluating at the entity performance of the authorized ones of the jewelry retailers over time based upon the information stored at the central terminal.

8. The method of claim 1, further comprising providing from the central terminal at least one program capable of controlling at least one operation of at least one of a first computer terminal, a first user input device, a first camera device and a first printing device of a first of the jewelry retailers.

9. The method of claim 1, wherein at least some of the information received at the central terminal from the retailer terminals is subsequently downloaded to an additional computer, and wherein the additional information includes issuance date information.

10. The method of claim 9, wherein the central terminal interacts with a first of the retailer terminals of a first of the jewelry retailers on first and second occasions in relation to a first of the jewelry items, wherein the first jewelry retailer failed to sell the first jewelry item on the first occasion but did sell the first jewelry item on the second occasion.

11. The method of claim 9, wherein the additional computer is operated by a third party selected from the group consisting of a wholesaler, an additional retailer, and a customer.

12. The method of claim 9, wherein the additional computer, the central terminal and the retailer terminals are all in communication via the internet.

13. The method of claim 9, wherein the central terminal is configured to allow the additional computer to obtain from the central terminal additional information concerning at least one of (i) jewelry item grading information; and (ii) casualty loss insurance information.

14. The method of claim 1, wherein based upon the received information the central terminal determines whether updated information should be obtained at a future time, wherein the central terminal is configured to automatically obtain the updated information, and wherein, after the central terminal receives the updated information, the central terminal automatically sends out a notification that an updated version of the certificate is available to a customer that earlier received the certificate.

15. A method of certifying jewelry items sold by jewelry retailers to customers, the method involving interactions between retailer terminals of the jewelry retailers and a central terminal of an entity independent of the jewelry retailers, the method comprising:
(a) making available a website at the central terminal, wherein the website is accessible by the retailer terminals via an internet-based communications medium;
(b) sending web page information from the central terminal for receipt by the retailer terminals, the web page information allowing for the formation of at least one graphical user interface at the retailer terminals;
(c) receiving and storing at the central terminal respective jewelry-related information pertaining to respective ones of the jewelry items, the jewelry-related information being received from the retailer terminals subsequent to entry of at least some of the jewelry-related information by the jewelry retailers via the at least one graphical user interface at the retailer terminals, wherein the jewelry-related information includes image information regarding the jewelry items obtained from camera devices and information regarding at least one characteristic of the jewelry items entered by the jewelry retailers via user input devices associated with the retailer terminals of the jewelry retailers;
(d) issuing certificates from the entity to be provided to the customers when the jewelry items are sold to the customers, wherein each respective certificate includes the respective jewelry-related information pertaining to the respective jewelry item sold, and wherein in relation to the sales additional information is received and stored at the central terminal, the additional information including certificate numbers corresponding to the issued certificates, customer-related information concerning the customers who purchased the jewelry items, and retailer-identity information concerning the jewelry retailers who sold the jewelry items purchased by the customers;
(e) providing guarantees or warranties from the entity to the customers that the jewelry-related information provided on the certificates is accurate, wherein the entity in particular provides the guarantees or warranties in relation to those of the certificates that pertain to those of the jewelry items sold by authorized ones of the jewelry retailers; and
(f) performing, by the entity, at least one additional action upon the entity detecting inaccurate information in at least one of the certificates based upon a comparison of customer-provided information with at least some of the information stored at the central terminal, the at least one additional action including at least one of: taking at least one enforcement action against at least one of the jewelry retailers; providing at least one refund to at least one of the customers; and providing at least one corrected certificate to at least one of the customers; and
(g) sending data from the central terminal to at least some of the retailer terminals in response to inquiries received at the central terminal from the at least some retailer terminals, the sent data including at least some of the jewelry-related information and the additional information stored at the central terminal.

16. The method of claim 15, wherein the at least one graphical user interface at the retailer terminals further allows for the jewelry retailers to view draft certificate images.

17. The method of claim 15, further including:
(h) determining based at least in part upon the jewelry-related information at the central terminal that a first characteristic of a first of the jewelry items may have sufficiently changed subsequent to the issuing of a first of the certificates pertaining to the first jewelry item, such that it is appropriate for the first certificate to be updated; and
(i) upon making a determination in accordance with (g), sending an offer from the entity regarding updating of the first certificate pertaining to the first jewelry item.

18. The method of claim 17, further including:
(j) sending data from the central terminal to at least some of the retailer terminals in response to inquiries received at the central terminal from the at least some retailer terminals, the sent data including at least some of the jewelry-related information and the additional information stored at the central terminal.

19. The method of claim 17, further comprising:
(j) evaluating at the entity performance of the authorized ones of the jewelry retailers over time based upon the information stored at the central terminal.

20. The method of claim 17, further comprising providing from the central terminal at least one program capable of controlling at least one operation of at least one of a first computer terminal, a first user input device, a first camera device and a first printing device of a first of the jewelry retailers.

21. A system for certifying jewelry items sold by jewelry retailers to customers, the system comprising:
a central terminal associated with an entity independent of the jewelry retailers that includes at least one database, the central terminal providing a website that is accessible by retailer terminals via an internet-based communications medium and sends web page information from the central terminal for receipt by the retailer terminals, the web page information allowing for formation of at least one graphical user interface at the retailer terminals, the central terminal receiving and storing within the at least one database respective jewelry-related information pertaining to respective ones of the jewelry items, the jewelry-related information being received from the retailer terminals subsequent to entry of at least some of the jewelry-related information by the jewelry retailers via the at least one graphical user interface at the retailer terminals, wherein the jewelry-related information includes image information regarding the jewelry items obtained from camera devices and information regarding at least one characteristic of the jewelry items entered by the jewelry retailers via user input devices associated with the retailer terminals of the jewelry retailers, wherein a plurality of certificates are issued by the entity to be provided to the customers when the jewelry items are sold to the customers, wherein each respective certificate includes the respective jewelry-related information pertaining to the respective jewelry item sold, wherein in relation to the sales additional information is received and stored at the central terminal, the additional information including certificate numbers corresponding to the issued certificates, customer-related information concerning the customers who purchased the jewelry items, and retailer-identity information concerning the jewelry retailers who sold the jewelry items purchased by the customers, wherein the entity provides guarantees or warranties to the customers that the jewelry-related information provided on the certificates is accurate, the entity in particular providing the guarantees or warranties in relation to those of the certificates that pertain to those of the jewelry items sold by authorized ones of the jewelry retailers, and wherein the entity performs at least one additional action upon the entity detecting inaccurate information in at least one of the certificates based upon a comparison of customer-provided information with at least some of the information stored at the central terminal, the at least one additional action including at least one of: taking at least one enforcement action against at least one of the jewelry retailers; providing at least one refund to at least one of the customers; and providing at least one corrected certificate to at least one of the customers.

22. The system of claim 21, wherein the at least one graphical user interface enables the jewelry retailers to view draft certificate images.

23. The system of claim 21, wherein the at least one characteristic of the jewelry items concerns a quality characteristic of the jewelry item and a value of the jewelry item.

24. The system of claim 21, wherein the central terminal further determines, based at least in part upon the jewelry-related information stored at the central terminal, that a first characteristic of a first of the jewelry items may have sufficiently changed subsequent to the issuing of a first of the certificates pertaining to the first jewelry item, such that it is appropriate for the first certificate to be updated, and wherein, upon making such a determination, the entity sends an offer regarding updating of the first certificate pertaining to the first jewelry item.

25. The system of claim 21, wherein the central terminal further sends data to at least some of the retailer terminals in response to inquiries received at the central terminal from the at least some retailer terminals, the sent data including at least some of the jewelry-related information and the additional information stored at the central terminal.

26. The system of claim 21, wherein the entity further evaluates performance of the authorized ones of the jewelry retailers over time based upon the information stored in the central terminal.

27. The system of claim 21, wherein the central terminal stores at least one program that is downloadable by the retailer terminals from the central terminal, wherein the at least one program is configured to enable controlling of at least one operation of at least one of the retailer terminals, a user input device, a camera device and a printing device.

28. The system of claim 21, further comprising a first of the retailer terminals.

29. The system of claim 28, wherein the first retailer terminal includes a memory device and a processing device, wherein the memory device includes a first program capable of controlling at least certain operations of at least one of a printing device and a camera device.

30. The system of claim 21, further comprising at least one additional computer that is in communication with the central terminal via the internet-based communications medium, the additional computer operated by at least one of a wholesaler, another retailer, and a customer.

31. The system of claim 30, wherein at least a portion of the information received by the central terminal is subsequently downloaded to the additional computer.

32. The system of claim 30, wherein the additional computer is affiliated with a third party independent of a first of the jewelry retailers that earlier failed to sell a first of the jewelry items to a first of the customers, and wherein the additional computer interacts with the central terminal so as to execute a transaction by which the first jewelry item is sold to an additional customer independent of the first customer and the first jewelry retailer.

* * * * *